United States Patent [19]
Gaskins et al.

[11] Patent Number: 6,161,188
[45] Date of Patent: Dec. 12, 2000

[54] MICROPROCESSOR HAVING FUSE CONTROL AND SELECTION OF CLOCK MULTIPLIER

[75] Inventors: Darius D. Gaskins; G. Glenn Henry, both of Austin, Tex.

[73] Assignee: IP-First, L.L.C., Fremont, Calif.

[21] Appl. No.: 09/193,303

[22] Filed: Nov. 17, 1998

[51] Int. Cl.[7] .................................................. G06F 1/04
[52] U.S. Cl. ............................................ 713/501; 713/600
[58] Field of Search .................................. 713/500, 501, 713/600, 601

[56] References Cited

U.S. PATENT DOCUMENTS

| | | | |
|---|---|---|---|
| 4,771,285 | 9/1988 | Agrawal et al. | 340/825.83 |
| 4,893,271 | 1/1990 | Davis et al. | 364/900 |
| 4,908,790 | 3/1990 | Little et al. | 364/900 |
| 5,099,453 | 3/1992 | Steele | 365/229 |
| 5,261,082 | 11/1993 | Ito et al. | 713/400 |
| 5,471,587 | 11/1995 | Fernando | 710/129 |
| 5,600,824 | 2/1997 | Williams et al. | 713/400 |

*Primary Examiner*—Thomas G. Black
*Assistant Examiner*—Mary Wang
*Attorney, Agent, or Firm*—Richard K. Huffman; James W. Huffman

[57] ABSTRACT

A microprocessor is provided having selective control features to determine its core-to-bus clock ratio. The microprocessor includes a fuse and buffer/control logic. The fuse, fabricated on the microprocessor's metalization or poly layer, can be blown with a laser during fabrication. When blown, the fuse provides a permanent state that prescribes a fixed core-to-bus clock ratio. The buffer/control logic is coupled to the fuse. The buffer/control logic accepts the permanent state and directs the microprocessor to set the core-to-bus clock ratio to a fix value, thus disabling control of the core-to-bus clock ratio via external clock ratio control signals.

22 Claims, 3 Drawing Sheets

Bus Frequency Ratios

| BF Fuse | BF2 | BF1 | BF0 | Clock Ratio |
|---|---|---|---|---|
| Intact | 1 | 0 | 0 | reserved |
| Intact | 1 | 0 | 1 | 3x |
| Intact | 1 | 1 | 0 | 2x |
| Intact | 1 | 1 | 1 | 4x |
| Intact | 0 | 0 | 0 | reserved |
| Intact | 0 | 0 | 1 | 5x |
| Intact | 0 | 1 | 0 | 4x |
| Intact | 0 | 1 | 1 | reserved |
| Blown[1] | don't care | don't care | don't care | 3x |

NOTES:

1. Asserting CTME pin when BF Fuse is blown enables configurable clock ratio control.

MICROPROCESSOR HAVING FUSE CONTROL AND SELECTION OF CLOCK MULTIPLIER

BACKGROUND OF THE INVENTION

1. Field of the Invention

This invention relates in general to clock signal generation in a microprocessor, and more particularly to an apparatus for enabling a fixed core-to-bus clock ratio while selectively disabling on-board clock ratio control signals.

2. Description of the Related Art

Over the past 30 years, innovations in integrated circuit design and fabrication techniques have resulted in a vast proliferation of desktop computer systems. No longer is ownership of a computer restricted to users in the scientific realm. Rather, desktop computers have become so ubiquitous in the marketplace that they are now on the verge of becoming commodity items. As a result of this surge in desktop system ownership, desktop computer designers have been forced to address a very broad spectrum of consumers, from those desiring high-end performance whose funds are relatively unrestricted to those who choose, primarily because of budget restrictions, to purchase low-end performance systems.

Although technology advances exist that would allow most elements in a desktop computer system to achieve significant performance gains, in order to maintain affordability for the average consumer, desktop computer designers have fundamentally focused on improving the performance of those elements that contribute in great measure to the overall performance of a desktop system. Because a microprocessor is at the heart of the desktop computer system, it follows then that the industry has witnessed microprocessor performance improvements almost an order or magnitude in excess of performance improvements in peripheral system bus devices such as memory, hard disk controllers, and like elements.

As a result, today's microprocessors are capable of operating at speeds roughly five times that of other devices on their system bus. In fact, both microprocessor designers and desktop computer system designers make provisions in their respective products to optimize the use of a fast microprocessor while at the same time minimizing the effects of delays caused by accesses to slower devices on the system bus. One exemplary provision is on-board cache. Present day microprocessors maintain a copy of frequently used data blocks from memory in on-board cache, specifically so that the data blocks can be repeatedly accessed at a faster speed without having to access a slower memory device on the system bus.

Another example of a feature provided by microprocessor designers to maximize the performance of a microprocessor employed in a low-end desktop system is a clock multiplier. Early microprocessors operated at the same speed at remaining devices in a desktop system. In most systems, a bus clock generator provided a bus clock signal to all devices on the system bus, to include the microprocessor. All devices operated at the frequency of the bus clock. However, today's microprocessors have employed the clock multiplier, a logic device internal to the microprocessor, to synchronously generate a core logic clock signal having a frequency up to several times that of the bus clock. The core logic clock is routed to core processing logic in the microprocessor thus enabling it to operate faster than the remaining devices on the system bus.

Early clock multipliers simply doubled the bus clock frequency. More recent microprocessors, however, provide clock ratio control signals that allow a desktop computer designer to choose from a specified range of clock ratios for generation of the core clock signal. Such a feature is useful, particularly in consideration of the fact that production savings can be achieved when a microprocessor having easily configurable features is produced for a wide range of applications. Hence, most desktop computer designers provide a microprocessor on a motherboard that has jumpers to set the state of the clock ratio control signals. By simply installing or removing particular jumpers, the frequency of the core clock can be configured for a number of performance levels.

A more recent affordability feature provided in desktop systems is the ability for an end user to upgrade his system by simply replacing an older microprocessor with an upgraded microprocessor. Typically, rather than solder the older microprocessor directly to the motherboard when the system is produced, a manufacturer will solder a socket to the motherboard from which the microprocessor can be easily removed. The upgraded microprocessor is inserted in its place and, without return to the factory or a service call, the end user has affected a significant performance upgrade on his own.

The ideal upgrade scenario for desktop manufacturers is stated above: replace the older microprocessor with the upgraded microprocessor without a change to jumper settings the motherboard or the requirement to install additional logic devices. Although this ideal is sometimes achieved, such is not always the case. One skilled in the art will appreciate that any of a number of factors can result in departure from the ideal case, such departure being primarily driven by the degree of design information interchange between a microprocessor manufacturer and desktop computer manufacturers. More specifically, a significant problem faced by the industry today regards compatibility of clock ratio control signals provided on older motherboards with what is required to establish a core clock frequency in present day microprocessors.

Older motherboards only provide the capability to configure the state of one clock ratio control signal. But today's microprocessors require that two or three clock ratio signals be configured in order to prescribe a core clock signal frequency. As a result of this incompatibility, owners of desktop computer systems incorporating these older motherboards are precluded from upgrading their systems.

Therefore, what is needed is a microprocessor having a fixed core-to-bus clock ratio, configured during fabrication of the microprocessor, that ignores the states of clock ratio control signals provided by older motherboards.

In addition, what is needed is an apparatus in a microprocessor to permanently disable clock ratio control signals during normal operation, yet having the capability to control the clock ratio during test of the microprocessor.

Furthermore, what is needed is a microprocessor having a selective clock multiplier, whose functionality is configured during fabrication, either to function in accordance with its clock ratio control signals, or to ignore the clock ratio control signals and operate at a fixed clock ratio.

SUMMARY

To address the above-detailed deficiencies, it is an object of the present invention to provide a microprocessor with a configurable core-to-bus clock ratio, the configuration established during production of the microprocessor.

Accordingly, in the attainment of the aforementioned object, it is a feature of the present invention to provide a microprocessor having a configurable core-to-bus clock ratio, the configurable core-to-bus clock ratio determining a first frequency of a core clock signal within the microprocessor, the core clock signal being derived from a bus clock signal operating at a second frequency that is provided to the microprocessor from an external source. The microprocessor includes a fuse and buffer/control logic. The fuse provides a permanent state that prescribes the configurable core-to-bus clock ratio. The buffer/control logic is coupled to the fuse. The buffer/control logic accepts the permanent state and directs the microprocessor to either set the configurable core-to-bus clock ratio according to the states of a plurality of clock ratio signals or to ignore the states and set the configurable clock ratio to a fixed multiple of the second frequency.

An advantage of the present invention is that older desktop computer systems can be easily upgraded to a higher level of performance than that which has been heretofore provided.

Another object of the present invention is to provide an apparatus in a microprocessor to permanently disable clock ratio control signals during normal operation, yet possessing the capability to override such disablement during test of the microprocessor.

In another aspect, it is a feature of the present invention to provide an apparatus in a microprocessor for determining a core clock frequency of a core clock signal, the core clock signal being derived from a bus clock signal that is provided from without the microprocessor. The apparatus has ratio determination logic and buffer/control logic. The ratio determination logic provides a fixed/variable clock ratio signal. The buffer/control logic is coupled to the ratio determination logic. The buffer/control logic directs the microprocessor to set a core-to-bus clock ratio based upon the fixed/variable clock ratio signal and a plurality of clock ratio signals. If the fixed/variable clock ratio signal indicates a fixed core-to-bus clock ratio, the buffer control logic directs the microprocessor to disregard the plurality of clock ratio signals.

In yet another aspect, it is a feature of the present invention to provide a microprocessor having a core-to-bus clock ratio, the core-to-bus clock ratio determining a first frequency of a core clock signal within the microprocessor, the core clock signal being derived from a bus clock signal provided from an external source. The microprocessor includes ratio determination logic, buffer/control logic, and a selective clock multiplier. The ratio determination logic provides a fixed/variable clock ratio signal. The ratio determination logic has a fuse that provides an electrical signal path for the fixed/variable clock ratio signal. The buffer/control logic is coupled to the ratio determination logic and converts a state of the electrical signal path into a voltage level. The voltage level is in a default state if the fuse is intact and in an altered state otherwise. The selective clock multiplier is coupled to the buffer/control logic. The selective clock multiplier receives the bus clock signal and the voltage level, for generating the core clock signal. The first frequency of the core clock signal is a multiple of a second frequency of the bus clock signal. CVhen the voltage level is in the altered state, the selective clock multiplier is unresponsive to clock ratio signals, the clock ratio signals prescribing the multiple when the voltage level is in the default state.

Another advantage of the present invention is that a single, cost-effective microprocessor design can be used to configure both fixed clock ratio and variable clock ratio desktop computer systems.

Yet another object of the present invention is to provide a microprocessor with a selective clock multiplier, configured during fabrication to operate in accordance with its clock ratio control signals, or to ignore the clock ratio control signals and operate at a fixed clock ratio.

In a further aspect, it is a feature of the present invention to provide an apparatus in a microprocessor for generating a core clock signal having a configurable frequency or a fixed frequency. The apparatus has a selective clock multiplier, buffer/control logic, and a fuse. The selective clock multiplier receives a system bus clock signal, and generates the core clock signal from the system bus clock signal, where a first frequency of the core clock signal is a multiple of a second frequency of the system bus clock signal. The buffer/control logic is coupled to the selective clock multiplier and enables/disables a plurality of clock ratio signals to prescribe the multiple during normal operation of the microprocessor. The fuse is coupled to the buffer/control logic. The fuse is capable of being blown during fabrication of the microprocessor, where blowing the fuse causes the buffer/control logic to disable the plurality of clock ratio signals and to fix the multiple to a predetermined value.

Yet another advantage of the present invention is that an affordable upgrade path is now available to current owners of desktop systems having clock ratio control signals that are incompatible with that required for a present day microprocessor.

BRIEF DESCRIPTION OF THE DRAWINGS

These and other objects, features, and advantages of the present invention will become better understood with regard to the following description, and accompanying drawings where.

DETAILED DESCRIPTION

In view of the above background on techniques for setting the frequency of a core processing clock in a microprocessor, several related art examples will now be described with reference to FIGS. 1 through 3. These examples illustrate how present day techniques for determining a core-to-bus clock ratio are disadvantageous, particularly when employed in desktop computers that are designed to accept upgraded versions of the microprocessor. Following this discussion, a detailed description of the present invention will be provided with reference to FIGS. 4 through 6. Use of the present invention allows clock ratio control signals to be effectively ignored by the microprocessor when it is installed in a desktop computer system that does not have the capability to select faster core clock frequencies. In such cases, a higher core-to-bus clock ratio is established regardless of the state of the clock ratio signals. Yet, although the clock ratio is fixed, the present invention also provides a feature to selectively re-enable control of the clock ratio through the clock ratio signals for test purposes.

Figure 1:
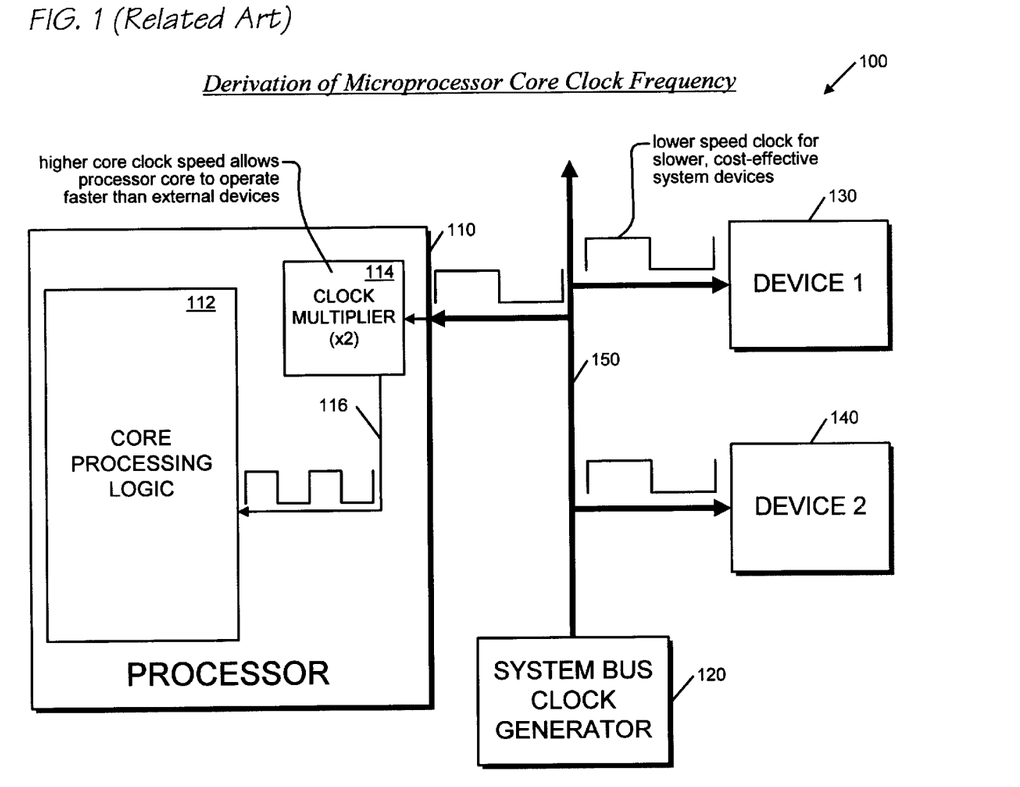
FIG. 1 is a block diagram illustrating how a related art microprocessor derives its internal core processing clock from an externally supplied system bus clock.

Now referring to FIG. 1, a diagram 100 is presented illustrating how a related art microprocessor derives its internal core processing clock from an externally supplied system bus clock. A microprocessor 110 is shown, connected to two external devices 130, 140, device 1 130 and device 2 140. In addition, a system bus clock generator 120 is depicted, providing a bus clock signal 150 to the microprocessor 110 and the two external devices 130, 140.

Operationally, in a desktop computer system, the system bus clock generator 120 is normally mounted on a motherboard (not shown) along with the microprocessor 110. The bus clock signal 150 is provided to every device on the system bus (not shown) so that data can be synchronously transferred between the microprocessor 110 and a given device such as device 1 130, or between devices, say between device 1 130 and device 2 140. Device 1 130 and device 2 140 represent any of a number of elements normally connected to a system bus in a desktop computer system to include memory, a hard disk controller, a graphics interface, and a modem card. All data transfers over the system bus are conducted with reference to the bus clock signal 150. A present day bus clock has a frequency ranging approximately from 50 to 100 megahertz (MHz).

Core processing logic within a present day microprocessor 110, on the other hand, can operate much faster, roughly three times the speed of the bus clock signal 150. This is advantageous in a desktop computer system because the microprocessor is most often performing many operations on its own, without requiring access to the system bus. When access to the system bus is required, the ensuing data transfers are performed most often in bursts. And, although technology is extant to allow most devices on the system bus to operate at the same speed as the core processing logic, computer designers have found that providing such capability is not cost-effective on the open market. Rather, designers have chosen to continue to maximize the speed of the microprocessor 110, while providing less expensive, and correspondingly slower, devices 130, 140 on the system bus.

Perhaps the best example of this type of design philosophy is on-chip cache. A typical memory device (not shown) in a desktop computer system uses dynamic random access memory (DRAM) components. DRAM components are very inexpensive, but they are also slow, exhibiting access times commensurate with present day system bus clock speeds. Rather than provide faster components for the entire memory, computer designers have chosen to only provide fast components for a subset of the address space defined by the memory. This smaller memory device is called a cache. The cache operates at speeds commensurate with the speed of the microprocessor 110, yet it only holds a portion of the memory contents at any one point in time. As a result, hardware and software in the desktop computer system are provided to only keep the most frequently used memory addresses in cache. Virtually all present day microprocessors have an on-chip cache. Consequently, most accesses to memory addresses can be accomplished without communication over the system bus.

Because it is able to operate much faster than other devices on the system bus, the microprocessor 110 has a clock multiplier 114 that receives the bus clock signal 150, and multiplies the frequency of the bus clock signal 150 by a factor to generate a core clock signal 116, which is at a higher frequency than that of the bus clock signal 150. FIG. 1 illustrates generation of a core clock signal 116 having a frequency twice that of the bus clock signal 150. Doubling the frequency of the bus clock signal 150 via a clock multiplier 114 having a fixed multiplication factor of two is illustrative of an early x86-compatible microprocessor, such as the Intel486DX2™ processor. A phase-lock-loop device is employed within the clock multiplier 114 to generate a faster core clock signal 116 that is synchronized with the bus clock signal 150. The core clock signal 116 is provided to core processing logic 112 in the microprocessor 110, thus allowing it to run much faster than the devices 130, 140 connected to the system bus clock 150.

Microprocessors have continued to dramatically increase in speed over the more recent years. As a result, desktop computer designers have observed that it is advantageous to produce desktop computers having a broad range of capabilities-and related prices. On one extreme, there is a requirement for high-end performance. For a high performance desktop system, a fast microprocessor and devices 130, 140 are utilized. One the other extreme, there is also a requirement for low-end performance. For a low performance desktop system, a slower microprocessor 110 is used with the same speed devices 130, 140. Yet, because the same devices 130, 140 are employed in both high-end and low-end systems, the system bus clock 150 must be multiplied by different factors to supply the core logic clock signal 116 to the core processing logic 112: a lower factor to generated the clock signal 116 for a slower microprocessor and a higher factor to generate the clock signal 116 for a faster microprocessor. As a result, microprocessor designers have found it advantageous to provide the capability for a desktop computer designer to select the factor by which the frequency of the bus clock signal 150 is multiplied to produce the core clock signal 116. The capability to set this multiplication factor, or core-to-bus clock ratio, is more fully described with reference to FIG. 2.

Figure 2:
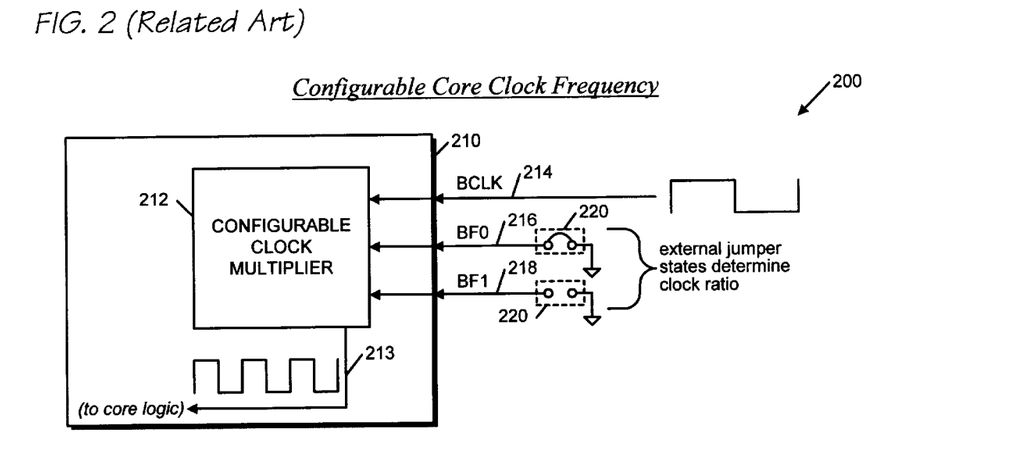
FIG. 2 is a block diagram of a related art microprocessor employing a configurable clock multiplier used to derive its internal core processing clock.

Referring to FIG. 2, a block diagram 200 is presented of a related art microprocessor 210 employing a configurable clock multiplier 212. The configurable clock multiplier 212 is used to derive an internal core processing clock 213 for the microprocessor's core processing logic (not shown). The microprocessor 210 is interfaced to a bus clock generator (not shown) like that shown in FIG. 1, which provides a bus clock signal 214, BLCK. The microprocessor 210, along with the bus clock generator, are mounted on a motherboard (not shown) in a desktop computer system. The block diagram 200 also depicts core-to-bus clock ratio control signals, BF0 216 and BF1 218, that interface to the configurable clock multiplier 212 along with BCLK 214. The states of BF0 216 and BF1 218 are set, respectively, by jumpers 220 on the motherboard.

In operation, the jumpers 220 are either installed or not installed during assembly of the motherboard, corresponding to the level of performance desired of the microprocessor 210 in the particular desktop computer system within which it is to be employed. For example, in a high performance system having a relatively high frequency bus clock signal 214, the jumpers 220 most likely would be set to prescribe a low core-to-bus clock ratio, say a factor of two. In a mid-performance system having a relatively mid-range frequency bus clock signal 214, the jumpers 220 would be set to prescribe a mid-range core-to-bus clock ratio, say a factor of three. In a low performance system having a relatively low frequency bus clock signal 214, the jumpers 220 most likely would be set to prescribe a high core-to-bus clock ratio, say a factor of four. Various techniques exist for mapping the state of core-to-bus clock ratio signals 216, 218 to specific core-to-bus clock ratios. In addition, a ratio factor does not have to be an integer; some present day microprocessors prescribe fractional core-to-bus clock ratios, like 5/2 or 9/4. Furthermore, some present day microprocessors only have one core-to-bus clock ratio signal 216; other microprocessors have more than one ratio signal. Regardless of how the signals 216, 218 are mapped to a ratio, or how a ratio is prescribed, or how many different ratios can be selected, one skilled in the art will appreciate that the example depicted in the block diagram 200 is indicative of present day techniques for deriving a core clock signal 213 in a microprocessor 210.

During power-up, the microprocessor 210 reads the state of the core-to-bus clock ratio signals 216, 218, which reflect settings of the jumpers 220 on the motherboard. Based upon the state of the signals 216, 218, the configurable clock generator 212 produces an internal core clock signal 213 that is synchronized with the bus clock signal, BCLK 214. Thus, core processing logic (not shown) runs faster than devices on the system bus by the factor equal to the core-to-bus clock ratio prescribed by BF0 216 and BF1 218.

Earlier motherboard designs adequately addressed the full range of a given microprocessor's core-to-bus clock ratio by providing jumpers 220 commensurate with connection pins provided on the microprocessor's package. By doing so, a given motherboard design could be used in a desktop computer having any of the performance ranges discussed above. By simply configuring jumpers 220 on the motherboard, the core-to-bus clock ratio was set.

In spite of the innovations noted above for configuring the performance level of a desktop computer, there is one additional level of desktop performance configurability that has surfaced in more recent years, to wit, the ability to upgrade an existing desktop computer by replacing its microprocessor with an upgraded microprocessor. The cost of low-end desktop systems has become so prohibitive to some consumers that desktop computer system designers, working closely with their counterparts in the microprocessor industry, are now designing motherboards that include provisions for an end user to upgrade the performance of his system by simply replacing the microprocessor on his motherboard. The most common technique for providing this upgrade capability in a desktop system, that is, providing a pre-wired socket for the upgraded microprocessor, is more specifically described with reference to FIG. 3.

Figure 3:
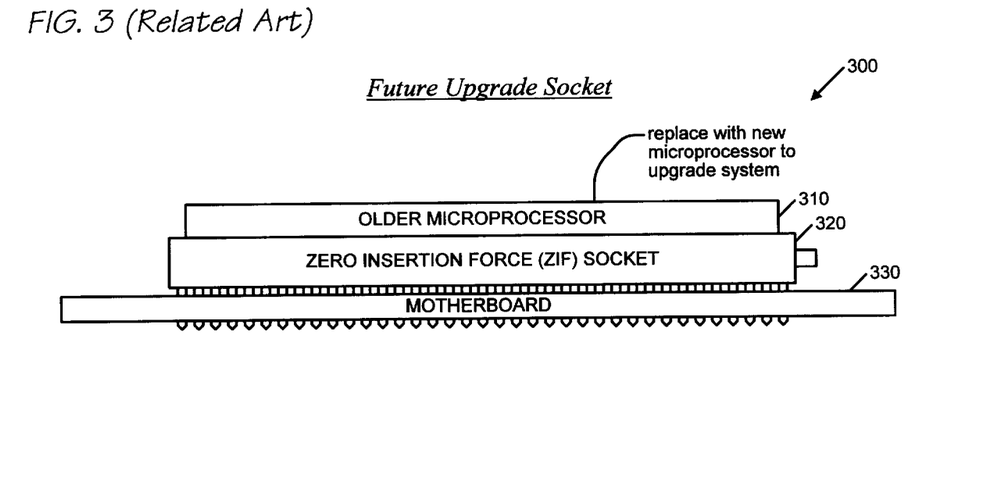
FIG. 3 is a diagram depicting a related art apparatus for upgrading a desktop computer.

Referring to FIG. 3, a diagram 300 is presented depicting a related art apparatus for upgrading a desktop computer. The diagram 300 shows an older microprocessor 310 installed in a zero insertion force (ZIF) socket 320. The ZIF socket 320 is permanently assembled into a motherboard 330 of the desktop computer.

Functionally, the older microprocessor 310, or any other form and fit compatible microprocessor, can be inserted and removed from the ZIF socket 320 by hand. As the motherboard 330 is being assembled, rather than directly soldering the older microprocessor 310 to the motherboard 330, the ZIF socket 320 is installed in its place. The ZIF socket 320 pin configuration is compatible with the pin configuration of the microprocessor 310 and simply passes signals from the motherboard 330 to the microprocessor 310, without intervening circuitry. The ZIF socket 320 thus provides the capability for an end user to easily remove and replace the microprocessor 310 at a later time. By providing this capability, desktop computer manufacturers enable consumers to upgrade their own system by simply purchasing an upgraded microprocessor. The upgraded microprocessor is sent to the end user along with simple instructions showing him how to remove the older microprocessor 310 and replace it with the upgraded microprocessor. After the end user accomplishes the replacement, he has upgraded his desktop computer to a greater level of performance than he previously had obtained.

At most, the end user may only have to change the state of a few jumpers (not shown) on the motherboard 330, like the jumpers 220 discussed with reference to FIG. 2, to effect the upgrade. For instance, since the upgraded microprocessor is capable of running at a faster core clock frequency, the end user would most likely be instructed to change the state of jumpers affecting the core-to-bus clock ratio, to speed up the core clock signal within the upgraded microprocessor.

In many cases there is a close association between the desktop computer designers and designers of the upgraded microprocessor. Consequently, even if more signals are added to the upgraded microprocessor that require interface to the motherboard 330, the desktop computer designers make provisions in their motherboard 330 to provide the new signals to the upgraded microprocessor when it is installed in the ZIF socket 320. Provisions are also made on the motherboard 330 to provide whatever interface is necessary for the new signals. For example, if the older microprocessor 310 only has two core-to-bus clock ratio control signals, like that shown in FIG. 2, and if the upgraded microprocessor has three core-to-bus clock ratio signals, then a close association between designers would most likely result in a motherboard 330 and ZIF socket 320 having three core-to-bus clock ratio signals rather than two. These signals would be provided along with other necessary provisions to easily configure the core-to-bus clock ratio of the upgraded microprocessor.

Though desktop computer designers indeed try to maximize the flexibility of their motherboard designs, particularly with regard to upgrade scenarios, things can happen that cause problems. For example, the design of an upgraded microprocessor can change after the motherboard design is in production. One skilled in the art will appreciate that any number of circumstances can contribute to later changes in a microprocessor design. In addition, desktop/microprocessor designer associations are more closer in some cases than others, particularly when proprietary rights and licensing issues are prevalent. Furthermore, some end users are now attempting to upgrade with microprocessors that were not even architected when the end users' desktop systems were produced. The above examples are only a few of the many factors that drive microprocessor designers to provide compatibility provisions in their upgraded microprocessors for interface to older, or perhaps dissimilar, motherboard designs.

Core-to-bus clock ratio control signals is a problematic area in the x86-compatible microprocessor industry in particular. Older x86-compatible microprocessors have only one core-to-bus ratio control signal, thus allowing configuration of only two clock ratios. In more recent years, upgraded x86-compatible microprocessors have been produced having two and three core-to-bus clock ratio signals. Because of the reasons cited above, there are a number of motherboard designs in existence that would otherwise be completely compatible with these upgraded x86-compatible microprocessors, were it not for incompatibility of their associated core-to-bus clock ratio control signals. In most cases, these motherboard designs only provide one core-to-bus clock ratio control signal. Thus, without intervening circuitry, some end users are prevented from upgrading their desktop system, simply because their motherboard design does not have the provisions to support more than one core-to-bus clock ratio signal. This is a problem. Were it not for clock ratio control signal inconsistencies, a significant number of end users would be able to achieve greater levels of performance in a cost-effective manner.

Some desktop computer manufacturers can address this problem when producing new desktop systems that utilize an older motherboard 330 by actually cutting connections on the ZIF socket 320 and introducing intervening circuitry in order to accept the upgraded microprocessor. But one skilled in the art will understand that this is an overall unacceptable approach because 1) aberrant assembly process steps that are labor intensive tend to drive up the cost of a product; and 2) addressing the problem in this manner most likely obviates configuration provisions of an existing design. After modification to accept the upgraded microprocessor, the motherboard 330 is no longer able to accept any other configuration.

A better solution to the problem is to provide a configuration option in an upgraded microprocessor that, when exercised, causes the microprocessor to fix the core-to-bus clock ratio and simply ignore signals provided on the motherboard 330 to control the core-to-bus clock ratio. But, producing a variant of the microprocessor that ignores core-to-bus clock ratio control signals is not cost-effective either, unless a single microprocessor design can be obtained having both capabilities, to disable or enable functionality of the core-to-bus clock ratio control signals. In fact, one skilled in the art will appreciate that during test of a microprocessor having a configurable clock ratio, it is very desirable to perform certain tests at a low core-to-bus clock ratio, other tests at a midrange clock ratio, and some tests at a high clock ratio. Of course, most often a microprocessor under test is not constrained within a ZIF socket 320 and manufacturing test equipment is interfaced to connections on the microprocessor package that are perhaps only known to the manufacturer of the microprocessor.

These problems and scenarios cited with reference to FIGS. 1 through 3 are overcome by the present invention. In fact, use of the present invention allows a microprocessor to be configured, during fabrication, to fix the core-to-bus clock ratio and ignore the state of core-to-bus clock ratio control signals. Yet, the present invention additionally provides the ability to override this feature during test by asserting a special test signal. When the special test signal is asserted, control of the microprocessor's core-to-bus clock ratio via clock ratio control signals is re-enabled. The present invention is more fully described with reference to FIGS. 4 through 6.

Figure 4:
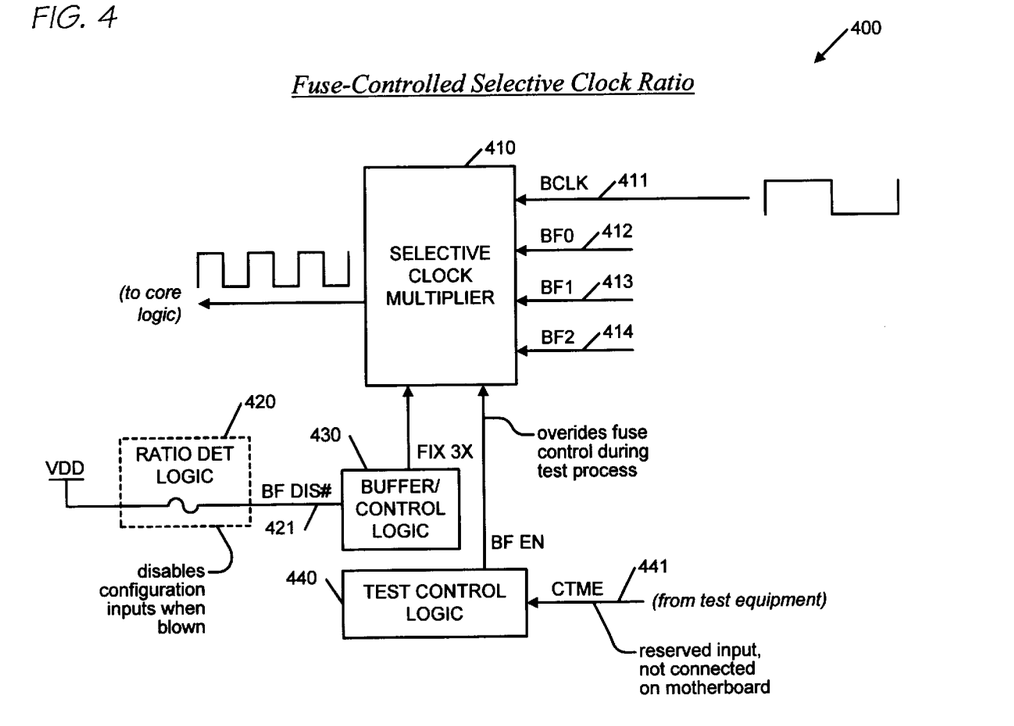
FIG. 4 is a block diagram of a microprocessor according to the present invention providing a fuse-controlled selective clock multiplier.

Referring to FIG. 4, a block diagram is presented of a microprocessor 400 according to the present invention. The microprocessor includes a selective clock multiplier 410 that receives a bus clock signal, BCLK 411, along with three core-to-bus clock ratio control signals, BF0 412, BF1 413, and BF2 414. The microprocessor also includes ratio determination logic 420 that provides a fix/variable signal, BF DIS# 421 to buffer/control logic 430. The buffer control logic 430 provides an output to the selective clock multiplier 410. The microprocessor also includes test control logic 440 that interfaces to a special test signal, CTME 441, and provides an override signal, BF EN, to the selective clock multiplier 410.

In operation, the bus clock signal 411 is received by the selective clock multiplier 410. Like the configurable clock multiplier 212 of FIG. 2, the selective clock multiplier 410 multiplies a first frequency of the bus clock signal 411 by a factor prescribed by the state of the core-to-bus clock ratio control signals 412, 413, 414 to generate a core clock signal at a second frequency that is distributed to core processing logic (not shown) in the microprocessor 400. The three signals provide the capability to configure eight core-to-bus clock ratio factors. In one embodiment, the selective clock multiplier 410 comprises a phase-lock-loop.

Unlike conventional microprocessors, however, the microprocessor 400 according to the present invention incorporates the ratio determination logic 420. The ratio determination logic 420 is a logic device whose state can be permanently established, even when power is removed from the microprocessor 400. In one embodiment, the ratio determination logic is a fuse on either a metalization layer or a poly layer of the microprocessor. Other embodiments exist, to include read-only memory. Subsequent discussion focuses on the fuse embodiment. Because the fuse 420 is on an accessible layer of the microprocessor 400, during a point in the fabrication process, the fuse 420 can be blown by either a laser or other appropriate device. Henceforth, a microprocessor having an intact fuse 420 will enable control of the clock ratio via the clock ratio control signals 412, 413, 414. If the fuse 420 is blown, then an electrical path state provided by the fixed/variable signal, BF DIS# 421, is received by the buffer/control logic 430. The buffer/control logic 430 directs the selective clock multiplier 410 to establish a fixed core-to-bus clock ratio. One skilled in the art will appreciated that the factor, or multiplier, used to derive the clock ratio can be any reasonable integer or fraction. In the embodiment shown in FIG. 4, the factor is equal to three. Hence, when the ratio determination logic 420 has a permanent state directing the microprocessor 400 to fix the core-to-bus clock ratio, the selective clock multiplier 410 ignores the state of the clock ratio control signals 412, 413, 414 and multiples the first frequency of BCLK 411 by a factor of three to derive the core clock signal.

The test control logic 440 monitors the state of the special test signal, CMTE 441. If test equipment asserts CMTE 441, then the test control logic 440 signals the selective clock multiplier 410 to override the fixed core-to-bus clock ratio and to re-enable control of the clock ratio via the control signals 412, 413, 414. Thus, a microprocessor 400 configured to provide a fixed clock ratio can be tested at the full range of available clock ratios by the same test program which is used to test parts that are not configured to provide a fixed clock ratio.

Figure 5:
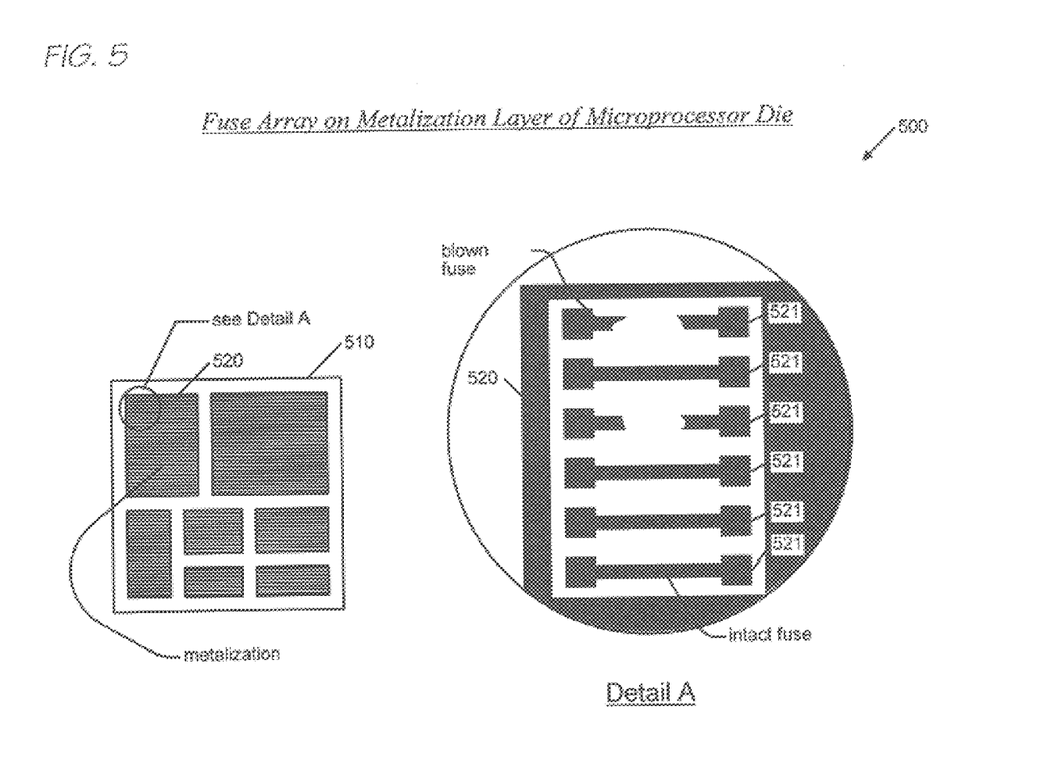
FIG. 5 is a diagram of a microprocessor die according to the present invention featuring fuse control on the microprocessor's metalization layer for determining core processing clock frequency.

Now referring to FIG. 5, a diagram 500 is presented of a microprocessor die 510 according to the present invention featuring fuse control on the microprocessor's metalization layer for determining core processing clock frequency. The die 510 includes a metalization area 520. In a portion of the metalization area 520, a number of fuses 521 have been fabricated to form a fuse array. In one embodiment, one of the fuses 521 is employed to fix the clock ratio. Under magnification, the state of the fuses 521 is easily observed: two of the fuses 521 are blown; the remaining four fuses 521 are intact. Electrical signals from the fuses 521 to buffer/control logic (not shown) in the microprocessor are provided in layers not visible on the surface of the die 510.

Figure 6:
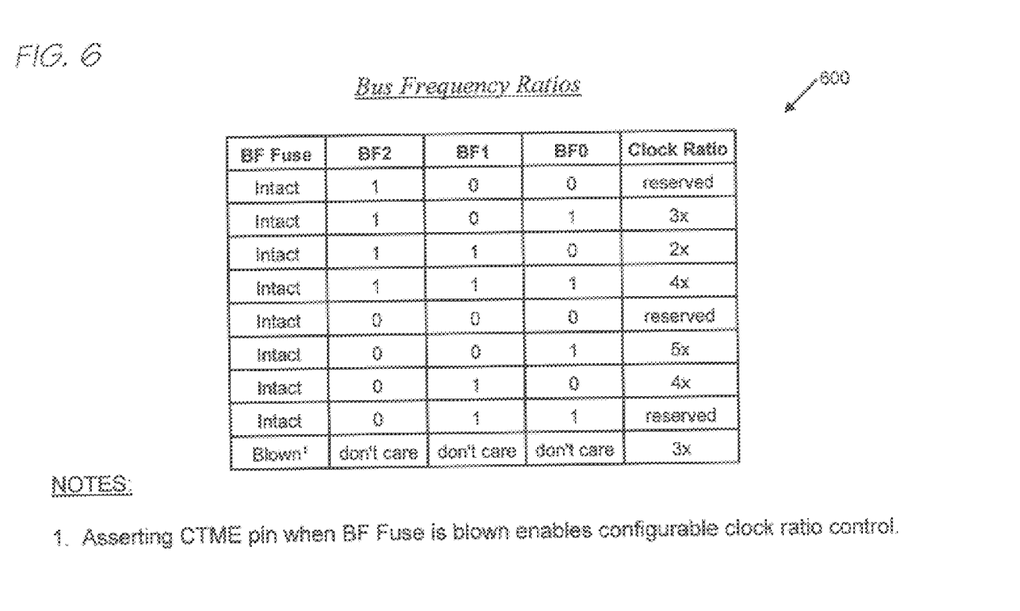
FIG. 6 is a table illustrating how core-to-bus clock frequency ratio is determined the microprocessor of FIG. 4.

Now referring to FIG. 6, table 600 is presented illustrating how core-to-bus clock frequency ratio is determined in the microprocessor 400 of FIG. 4. The table 600 indicates a core-to-bus clock ratio in the Clock Ratio column for each of the states of core-to-bus clock ratio control signals BF0 412, BF1 413, and BF2 414, when the microprocessor is configured for normal operation. The table also indicates the core-to-bus clock ratio when the microprocessor is configured for fixed-ratio operation. The normal operation configuration is indicated in the BF Fuse column by "Intact." Fixed-ratio operation is indicated in the same column by "Blown."

The table 600 is presented as only one embodiment of the present invention, having three "reserved" clock ratios. A reserved ratio is one that is not allowed for configuration. The remaining ratios indicate that the microprocessor core clock can be configured to operate as low as two times the frequency of the bus clock and as high as five times the frequency of the bus clock. Mid-range multiples of the bus clock frequency, 3× and 4× also are presented. Although specific binary values of the control signals 412, 413, 414 are mapped to specific clock ratios in the table 600, one skilled in the art will appreciate that such is an implementation detail. The embodiment shown in FIG. 6 serves to illustrate how the ratio is determined when the microprocessor 400 is configured for normal operation. In addition, as discussed earlier, the clock ratio is according to the present invention is not restricted to the values shown in the table 600 nor is it restricted to integer multiples of the bus clock frequency.

When the microprocessor 400 is configured for fixed-ratio operation, the multiplier for the bus clock frequency is equal to three, regardless of the state of BF0 412, BF1 413, or BF2 414. The last row of table 600 illustrates the fixed-ratio configuration, wherein the fuse 420 is shown to be blown. However, in the fixed-ratio configuration, when the special test signal, CMTE 441, is asserted, control of the clock ratio via the control signals 412, 413, 414 is enabled in accordance with their respective states shown in the table 600 for normal operation.

The example of FIGS. 3 through 6 illustrates that use of the present invention for deriving a core-to-bus clock ratio in a microprocessor provides many benefits heretofore unavailable. Employment of the present invention allows an upgraded microprocessor to be provided in a present day motherboard having a full range of clock ratio configurations. In addition, a cost-effective solution is provided wherein the clock ratio signals are ignored and a fixed clock ratio is established, thus allowing an upgrade path for desktop computer systems with motherboard whose clock ratio control signals are incompatible with the microprocessor. Yet, although the microprocessor, in one configuration, establishes a fixed core-to-bus clock ratio, full-range ratio configurability can be achieved by asserting the special test control signal.

Although the present invention and its objects, features, and advantages have been described in detail, other embodiments are encompassed by the invention. For example, the present invention has been particularly described in terms of a fuse fabricated on the metalization or poly layer of a microprocessor. Although a fuse embodiment provides ease of manufacture and configuration, other embodiments are comprehended to include active digital logic devices that retain their state upon removal of power from a microprocessor.

In addition, the present invention has been specifically described in terms of determining the core-to-bus clock ratio of a microprocessor. It is immaterial, however, whether the ratio is determined for a microprocessor. Rather, any integrated circuit that uses a clock multiplier can benefit through use of the present invention to include signal processors, embedded controllers, array processors, and industrial controllers.

Furthermore, the present invention has been particularly illustrated in terms of a microprocessor having three ratio control signals. Future microprocessors may have more control signals, or they even may employ a technique wherein certain signals are shared. That is, a given signal may be interpreted as a clock ratio control signal only when the microprocessor is in specified state. Else, the given signal is not interpreted as a clock ratio control signal. The present invention anticipates such improvements. By configuring the microprocessor for fixed-ratio operation, all ratio control signals, in any state of the microprocessor, are ignored and the clock ratio is fixed.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor having a configurable core-to-bus clock ratio, the configurable core-to-bus clock ratio determining a first frequency of a core clock signal within the microprocessor, the core clock signal being derived from a bus clock signal operating at a second frequency that is provided to the microprocessor from an external source, the microprocessor comprising:

a fuse, configured to provide a permanent state that prescribes the configurable core-to-bus clock ratio; and buffer/control logic, coupled to said fuse, configured to accept said permanent state and to direct the microprocessor to either set the configurable core-to-bus clock ratio according to the states of a plurality of clock ratio signals or to ignore said states and to set the configurable clock ratio to a fixed multiple of the second frequency.

2. The microprocessor as recited in claim 1, wherein said permanent state comprises an intact state or a blown state.

3. The microprocessor as recited in claim 1, wherein said fuse is fabricated on a metalization layer of the microprocessor.

4. The microprocessor as recited in claim 1, wherein said fuse is fabricated on a poly layer of the microprocessor.

5. The microprocessor as recited in claim 2, wherein, if said fuse is in said intact state, the second frequency of the core clock signal is determined to be a first multiple of said first frequency, said first multiple being prescribed by a plurality of clock ratio signals.

6. The microprocessor as recited in claim 5, wherein, if said fuse is in said blown state, the second frequency is determined to be the fixed multiple of the first frequency, without regard to said states of said plurality of clock ratio signals.

7. The microprocessor as recited in claim 6, wherein the second multiple is equal to three.

8. The microprocessor as recited in claim 1, further comprising:

a selective clock multiplier, coupled to said buffer/control logic, configured to receive the bus clock signal and to generate the core clock signal.

9. An apparatus in a microprocessor for determining a core clock frequency of a core clock signal, the core clock signal being derived from a bus clock signal that is provided from without the microprocessor, the apparatus comprising:

ratio determination logic, configured to provide a fixed/variable clock ratio signal; and buffer/control logic, coupled to said ratio determination logic, configured to direct the microprocessor to set a core-to-bus clock ratio based upon said fixed/variable clock ratio signal and a plurality of clock ratio signals, wherein, if said fixed/variable clock ratio signal indicates a fixed core-to-bus clock ratio, said buffer control logic directs the microprocessor to disregard said plurality of clock ratio signals.

10. The apparatus as recited in claim 9, wherein said ratio determination logic comprises:

a logic device, having a default state or an altered state, said states persisting when power is removed from the microprocessor;

wherein, when said default state is provided by said logic device, said plurality of clock ratio signals prescribes a variable core-to-bus clock ratio for the microprocessor.

11. The apparatus as recited in claim 10, when said altered state is provided by said logic device, said buffer/control logic directs the microprocessor to disregard said plurality of clock ratio signals and to set said core-to-bus clock ratio to said fixed core-to-bus clock ratio.

12. The apparatus as recited in claim 9, further comprising:

a selective clock multiplier, coupled to said buffer/control logic, configured to receive the bus clock signal and to generate the core clock signal, wherein a first frequency of the core clock signal is a multiple of a second frequency of the system bus clock signal.

13. The apparatus as recited in claim 12, wherein, if said ratio determination logic directs the microprocessor to fix said core-to-bus clock ratio, said selective clock multiplier multiplies said second frequency of the bus clock signal by a factor to fix the said first frequency of the core clock signal.

14. The apparatus as recited in claim 13, wherein said factor is equal to three.

15. The apparatus as recited in claim 12, wherein, if said ratio determination logic directs the microprocessor to vary said core-to-bus clock ratio, said selective clock multiplier multiplies said second frequency of the bus clock signal by a factor prescribed by said plurality of clock ratio signals to set said first frequency of the core clock signal.

16. A microprocessor having a core-to-bus clock ratio, the core-to-bus clock ratio determining a first frequency of a core clock signal within the microprocessor, the core clock signal being derived from a bus clock signal provided from an external source, the microprocessor comprising:

ratio determination logic, configured to provide a fixed/variable clock ratio signal, said ratio determination logic comprising:

a fuse, configured to provide an electrical signal path for said fixed/variable clock ratio signal;

buffer/control logic, coupled to said ratio determination logic, configured to convert a state of said electrical signal path into a voltage level, said voltage level being in a default state if said fuse is intact and in an altered state otherwise; and a selective clock multiplier, coupled to said buffer/control logic, configured to receive the bus clock signal and said voltage level, for generating the core clock signal, wherein the first frequency of the core clock signal is a multiple of a second frequency of the bus clock signal, and wherein, when said voltage level is in said altered state, said selective clock multiplier is unresponsive to clock ratio signals, said clock ratio signals prescribing said multiple when said voltage level is in said default state.

17. The microprocessor as recited in claim 16, wherein said altered state is established by blowing said fuse.

18. The microprocessor as recited in claim 16, wherein said electrical signal path transcends application and removal of power to/from the microprocessor.

19. An apparatus in a microprocessor for generating a core clock signal having a configurable frequency or a fixed frequency, the apparatus comprising:

a selective clock multiplier, for receiving a system bus clock signal, and for generating the core clock signal from said system bus clock signal, wherein a first frequency of the core clock signal is a multiple of a second frequency of said system bus clock signal;

buffer/control logic, coupled to said selective clock multiplier, for enabling/disabling a plurality of clock ratio signals to prescribe said multiple during normal operation of the microprocessor; and a fuse, coupled to said buffer/control logic, capable of being blown during fabrication of the microprocessor, wherein blowing said fuse causes said buffer/control logic to disable said plurality of clock ratio signals and to fix said multiple to a predetermined value.

20. The apparatus as recited in claim 19, wherein said predetermined value is equal to three.

21. The apparatus as recited in claim 19, further comprising:

test control logic, coupled to said selective clock multiplier, for enabling said plurality of clock ratio signals to prescribe said multiple during test of the microprocessor, regardless of whether said fuse is blown.

22. The apparatus as recited in claim 21, wherein said test control logic comprises:

a test signal, configured to indicate that the microprocessor is under test rather than normal operation.

* * * * *